United States Patent
Jaouen et al.

(10) Patent No.: US 12,361,173 B2
(45) Date of Patent: Jul. 15, 2025

(54) METHOD OF MANAGING ACCESS RIGHTS FOR SOFTWARE TASKS EXECUTED BY A MICROCONTROLLER, AND CORRESPONDING INTEGRATED CIRCUIT

(71) Applicant: STMicroelectronics (Grand Ouest) SAS, Le Mans (FR)

(72) Inventors: Michel Jaouen, Yvre l'Eveque (FR); Loic Pallardy, Rouillon (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 276 days.

(21) Appl. No.: 17/812,883

(22) Filed: Jul. 15, 2022

(65) Prior Publication Data

US 2023/0015027 A1    Jan. 19, 2023

(30) Foreign Application Priority Data

Jul. 16, 2021    (FR) ...................................... 2107717

(51) Int. Cl.
  *G06F 21/62*      (2013.01)
  *G06F 12/0802*    (2016.01)

(52) U.S. Cl.
  CPC ...... *G06F 21/6281* (2013.01); *G06F 12/0802* (2013.01); *G06F 2212/60* (2013.01)

(58) Field of Classification Search
  CPC .......... G06F 21/6281; G06F 12/0802; G06F 2212/60; G06F 9/5016; G06F 12/1491; G06F 21/604; G06F 21/71; G06F 2212/105; G06F 12/1441
  See application file for complete search history.

(56) References Cited

U.S. PATENT DOCUMENTS

| | | | |
|---|---|---|---|
| 7,124,274 B2 | 10/2006 | Watt et al. | |
| 2007/0226795 A1* | 9/2007 | Conti | G06F 21/554 726/22 |
| 2010/0318569 A1* | 12/2010 | Munday | G06F 21/6227 707/769 |
| 2017/0177339 A1* | 6/2017 | Shanbhogue | G06F 21/52 |
| 2017/0371570 A1* | 12/2017 | Wokhlu | G06F 3/0637 |

FOREIGN PATENT DOCUMENTS

| | | |
|---|---|---|
| EP | 1563380 A2 | 8/2005 |
| EP | 1987430 A2 | 11/2008 |
| EP | 3646189 A1 | 5/2020 |
| WO | 2007092951 A2 | 8/2007 |
| WO | 2019002810 A1 | 1/2019 |

OTHER PUBLICATIONS

Fang et al, Reducing cache and TLB power by exploiting memory region and privilege level semantics, Apr. 23, 2013. Journal of Systems Architecture (Year: 2013).*

* cited by examiner

*Primary Examiner* — Bruce S Ashley
(74) *Attorney, Agent, or Firm* — Slater Matsil, LLP

(57) ABSTRACT

In an embodiment a method for managing access rights of software tasks executed by a processing unit (CPU) using a cache memory containing execution data of the tasks in memory locations, each execution data having an attribute representative of a level of access right of the respective task, includes changing the attributes of the locations of the cache memory when the access rights of at least one task changes and retaining the execution data contained in the locations of the cache memory.

18 Claims, 5 Drawing Sheets

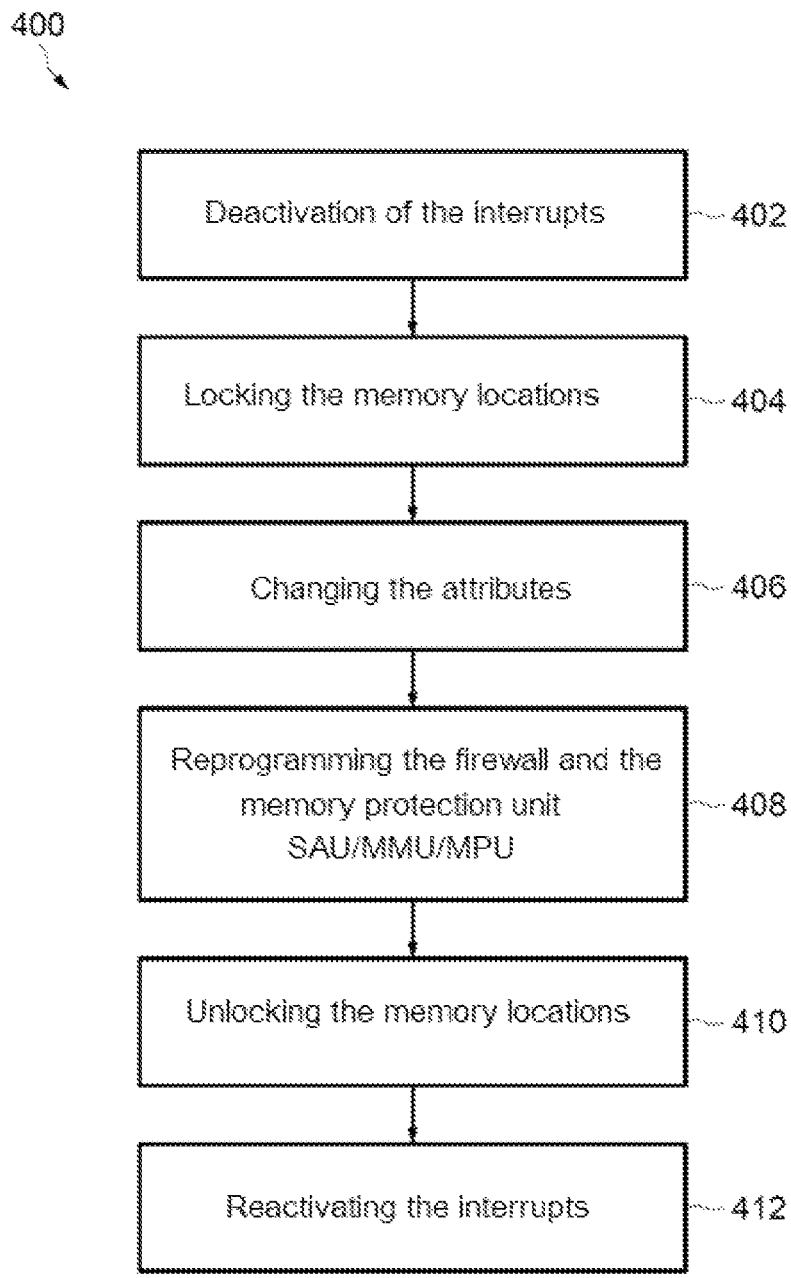

METHOD OF MANAGING ACCESS RIGHTS FOR SOFTWARE TASKS EXECUTED BY A MICROCONTROLLER, AND CORRESPONDING INTEGRATED CIRCUIT

CROSS-REFERENCE TO RELATED APPLICATIONS

This application claims the benefit of French Patent Application No. 2107717, filed on Jul. 16, 2021, which application is hereby incorporated herein by reference.

TECHNICAL FIELD

Embodiments and implementations relate to microcontroller or microprocessor integrated circuits, in particular the management of the access rights of software tasks executed by microcontrollers or microprocessors.

BACKGROUND

The access rights of the software tasks are typically provided for security reasons when a secure operating system schedules a task consuming a memory slice occupied by another task.

The task sequences being executed, having hierarchically higher access rights can use memory slices of task sequences having hierarchically lower access rights.

Memory is mapped only to prevent the tasks having lower access rights from accessing memory slices reserved for hierarchically higher access rights while tasks having higher access rights use those memory slices.

When these memory slices are "cacheable", that is to say that it is possible to preload them into a cache memory which is an intermediate working memory with rapid access, before being used by the processor, it is conventionally necessary to empty the cache lines containing these memory slices in order to define new access rights for these memory slices.

Reference is made in this regard to FIGS. 1A and 1B.

FIG. 1A represents a state 110 of the access rights of an example of a microcontroller. The access rights are managed by a processing unit (or "processor") CPU and by a memory protection unit MPU/MMU, which define a "non-privileged" lower access right NPriv to the active task (in the state 110, the active task is the task Tsk_B), in order to guarantee that the active task Tsk_B will not be able to access the code and the data of the other tasks Tsk_A, Tsk_C, which are assigned a "privileged" access right Priv.

Indeed, in addition to the processor CPU and the memory protection unit MPU/MMU, a hardware firewall FWL monitors and protects the access to the different regions OS, Dat_A, Dat_B, Dat_C of the memory MEM. The firewall FWL further allows monitoring and protecting access to different memory regions by different devices driven by the executed tasks.

The firewall FWL can be dynamically programmed so as to follow the programming of the access rights Priv, NPriv of the executed tasks. This type of dynamic firewall allows in particular preventing the access to data Dat_A of the memory MEM relating to one of the tasks (for example the task Tsk_A, whose program code may be the property of a third party), by another task during its execution (for example the Tsk_B task whose program code can be the property of another third party).

In this state 110, only task B has been executed. The cache memory CCH only contains the code and the data of the Tsk_B task, and also the operating system OS.

FIG. 1B represents a state 120 in which the access rights of the state 110 have been changed, such that the task Tsk_A has become the active task.

Thus, the Tsk_A task is assigned a "non-privileged" access right NPriv, while the Tsk_B task is assigned a "privileged" access right Priv.

The memory protection unit MPU/MMU and the firewall FWL are reconfigured according to this change.

However, cache lines which contain information about task B are always marked with a "non-privileged" attribute NP in the cache memory.

In case of eviction of a cache line, that is to say when a line of the cache memory allocated to the previously active task Tsk_B is reallocated to the current active task Tsk_A, then the data contained in this line should be written in the region Dat_B of the memory MEM reserved for the previously active task Tsk_B.

However, the firewall FWL detects an illegal access and blocks the write access of the cache memory line having a (non-privileged) attribute NP since the access rights of the Tsk_B task have become privileged Priv during the execution of the task Tsk_A.

A current solution is to flush the cache memory CCH before each reconfiguration of the memory protection unit MPU/MMU and the firewall FWL, or else not to enable the use of the cache memory CCH for the memory regions MEM relating to certain tasks (for example the region Dat_B of the task Tsk_B).

This introduces performance degradations in both cases.

Another current solution is not to map exclusively the memory region MEM relating to a task (for example Tsk_B) with a higher level access right Priv, that is to say to leave, in state 120, a portion of the region Dat_B of memory MEM relating to the task Tsk_B with a lower level access right NPriv.

This introduces a degradation of the security of the isolation between the tasks.

Another current solution is to copy to a memory location having higher access rights P. The need to reconfigure the protection unit MPU/MMU and the firewall FWL, then to recopy the higher access memory P to the lower access right memory NP, when the task TSK_B becomes active again, is thus avoided.

On the one hand, this solution is only suitable in the case of a memory region shared between a secure task and a non-secure task. On the other hand, this solution has the drawback of using a greater space in memory, since it requires more copies in the memory. Increasing the memory size is problematic in terms of cost and space requirement.

SUMMARY

Embodiments provide a technique for managing access rights of software tasks allowing improving the performance of the microcontroller, without degrading the security obtained by the access rights, and without introducing any cost or additional hardware space requirement.

According to one embodiment, a method is proposed for managing access rights of software tasks executed by a processing unit using a cache memory to contain execution data of said tasks in memory locations each having an attribute representative of the level of access right of the respective task. The method comprises, in the case of change in the access rights of at least one task, a right updating process implemented by the processing unit, comprising a change in the attributes of the locations of the cache memory containing execution data relating to said at least one task and a retention of the execution data contained in said locations of the cache memory.

For example, the access rights of the software tasks are defined by an access right management unit.

In other words, the process for updating access rights in the cache memory according to this aspect allows the data contained in the cache memory to be quickly made consistent with the corresponding access rights. Thus, it is not necessary to implement the conventional techniques of flushing the cache memory, to provide partial lower access rights, nor to implement multiple copy actions to adapt the cache memory to the scheduling tasks.

Consequently, the operation of the microcontroller is more efficient and reliable. Moreover, updating the access rights in the cache memory consumes few resources and has an economical energy consumption.

According to one embodiment, a firewall mechanism monitors an access to a memory containing data relating to the software tasks conditionally on the access rights of said software tasks, the method comprising, in the case of change in the access rights of at least one task, a change in the conditions of access to the data relating to said at least one task following said change in the access rights.

For example, the memory can be a memory external or internal to the microcontroller integrated circuit, of the random access memory type (RAM) or of the non-volatile type (such as a "Flash" memory).

This corresponds to a dynamic firewall mechanism allowing in particular protecting data of the memory MEM relating to a task, during the execution of another task.

The process for updating the access rights in the cache memory according to this aspect allows an optimal use of the dynamic firewall, the data contained in the cache memory not suffering the problem of illegal access to the memory in case of line eviction.

According to one embodiment, the access rights of the software tasks comprise a privileged level and a non-privileged level, such that a non-privileged level task cannot access privileged level data or functions.

The management of the privileged level and non-privileged level access rights allows in particular giving access and preventing access to sensitive functions of the microcontroller, for example functions of programming controls of the microcontroller, such as the configuration of the microcontroller at start-up (usually "boot") or the programming of the access rights. Some hardware resources, such as stack registers, can be duplicated in the privileged and non-privileged domains, respectively.

According to one embodiment, the access rights of the software tasks comprise a secure level and a non-secure level, such that a non-secure level task cannot access data or functions respectively contained or implemented by a secure level hardware element.

Managing the secure level and non-secure level access rights generally corresponds to a physical separation of secure and non-secure hardware elements. The secure elements are generally provided to implement critical security functions, such as encryption/decryption accessing secret keys. Managing the access rights according to this aspect allows switching from one mode to another (secure mode and non-secure mode) more quickly, with fewer backups from the cache memory to another memory.

According to one embodiment, the right updating process further comprises a locking of the locations of the cache memory containing the execution data relating to said at least one task, before said change in the respective attributes, and an unlocking after said change in the attributes.

Locking the cache memory locations corresponds to a prohibition of changing these memory locations. Thus, even if no execution of another task changes the locations of the cache memory during the process, and even if the processing unit interrupts are deactivated during the process, the implementation of the process itself could lead to evictions of said memory locations, which are protected in this regard by the locking.

According to one embodiment, the right updating process further comprises a deactivation of the interrupts of the processing unit throughout the updating process.

Indeed, interrupts of the processing unit, which are typically tasks to be processed as a priority, could change and control evictions of the memory locations during the process. It is tolerable to deactivate the interrupts during the whole process, given its simplicity of implementation and therefore its speed of execution.

According to one embodiment, the right updating process can only be controlled by a task, executed by the processing unit, having a level of access right which is hierarchically higher than or equal to the level of access right represented by the changed attribute.

According to another embodiment, an integrated circuit, such as a microcontroller or a microprocessor is also proposed, including a processing unit configured to execute software tasks, a cache memory configured to contain execution data of said software tasks in memory locations each having an attribute representative of a level of access right of the respective task, and an access right management unit configured, in the case of change in the access rights of at least one task, to change the attributes of the locations of the cache memory containing execution data relating to said at least one task, and to retain the execution data contained in these locations of the cache memory.

According to one embodiment, the access right management unit is configured to define the access rights of the software tasks.

According to one embodiment, the integrated circuit is capable of cooperating with a firewall mechanism configured to monitor an access to a memory intended to contain data relating to the software tasks, conditionally on the access rights of said software tasks, the processing unit being configured, in the case of change in the access rights of at least one task, to change the conditions of access to the data relating to said at least one task of the firewall mechanism, following said change.

The memory and the firewall mechanism can be external or internal to the microcontroller/microprocessor integrated circuit, nevertheless, the processing unit is capable in both cases of changing (reprogramming) the conditions of access to the memory of said firewall mechanism.

According to one embodiment, the access rights of the software tasks comprise a privileged level and a non-privileged level, the access right management unit being configured such that a non-privileged level task cannot access privileged level data or functions.

According to one embodiment, secure level hardware elements and non-secure level hardware elements, in which the access rights of the software tasks comprise a secure level and a non-secure level, and the processing unit is configured such that a non-secure level task cannot access data or functions which are respectively contained or implemented by a secure level hardware element.

According to one embodiment, the access right management unit is further configured to lock the locations of the cache memory containing the execution data relating to said at least one task, before said change in the respective attributes, and to unlock them after said change in the attributes.

According to one embodiment, the access right management unit is further configured to deactivate the interrupts of the processing unit during the change in the attributes of the locations of the cache memory.

According to one embodiment, the processing unit is configured such that said change in the access rights of at least one task, can only be controlled by a task, executed by the processing unit, having a level of access right which is hierarchically higher than or equal to the level of access right represented by the changed attribute.

According to yet another embodiment, a process for updating at least one attribute representative of a level of access right of a content of a respective memory location of a cache memory is also proposed, comprising, at the request of a processing unit, a change in at least one attribute, without changing the content of the corresponding memory location.

According to yet further embodiments, a cache memory device is proposed, intended to be controlled by a processing unit, comprising memory locations configured to each have an attribute representative of a level of access right of the content of the respective memory location, the cache memory being capable, at the request of the processing unit, of performing a change in at least one attribute without changing the content of the corresponding memory location.

BRIEF DESCRIPTION OF THE DRAWINGS

Other advantages and features of the invention will become apparent on examining the detailed description of embodiments and implementations, without limitation, and of the appended drawings, in which:

FIG. 4 illustrates a right updating process according to an embodiment.

DETAILED DESCRIPTION OF ILLUSTRATIVE EMBODIMENTS

Figure 1A:
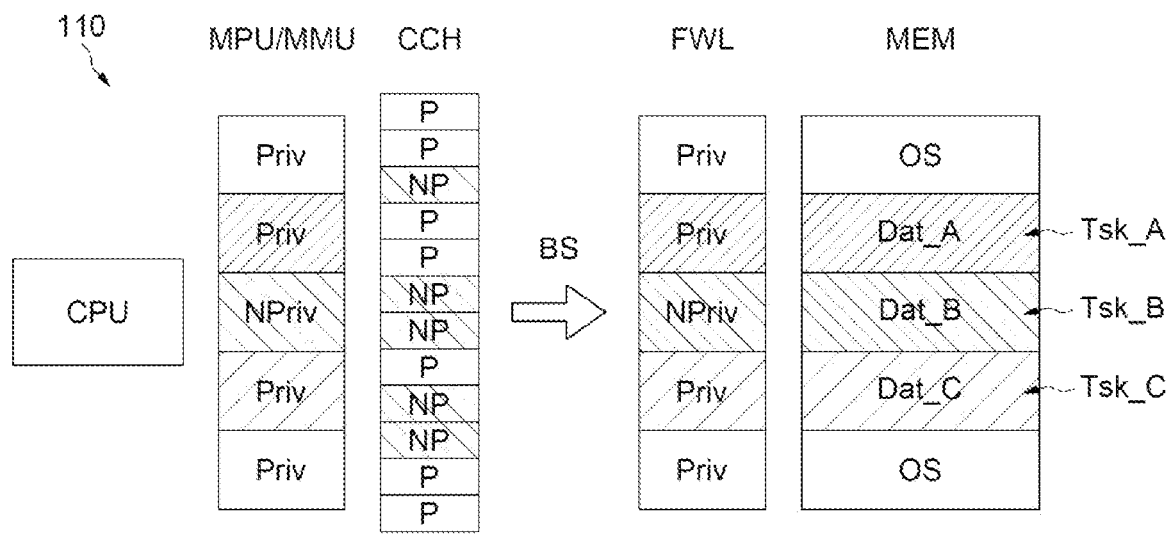
FIGS. 1A-1B represent prior art states of access rights of a microcontroller.
Figure 1B:
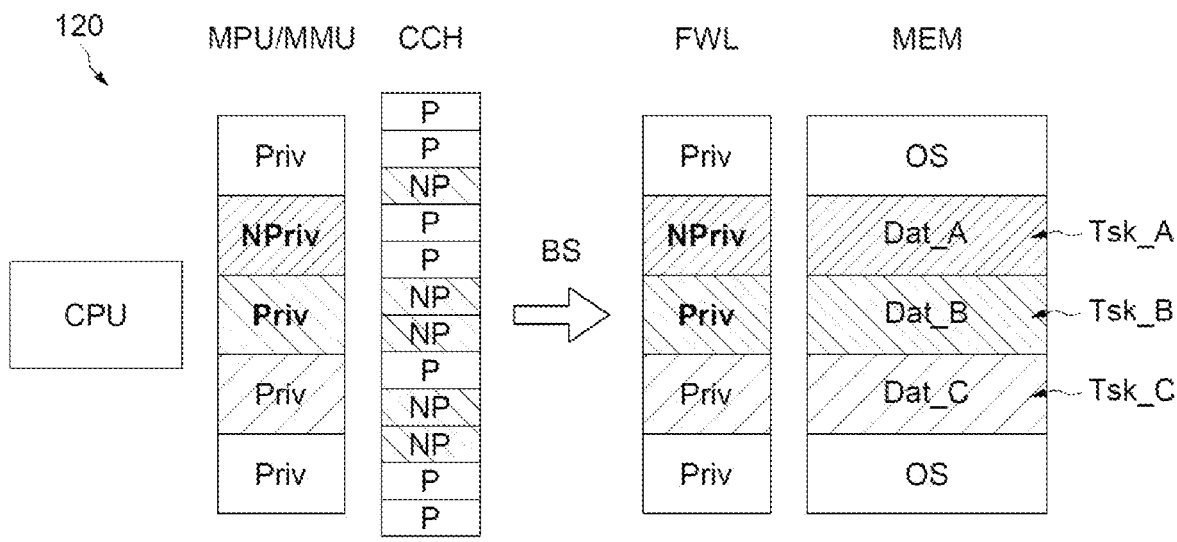
Figure 2A:
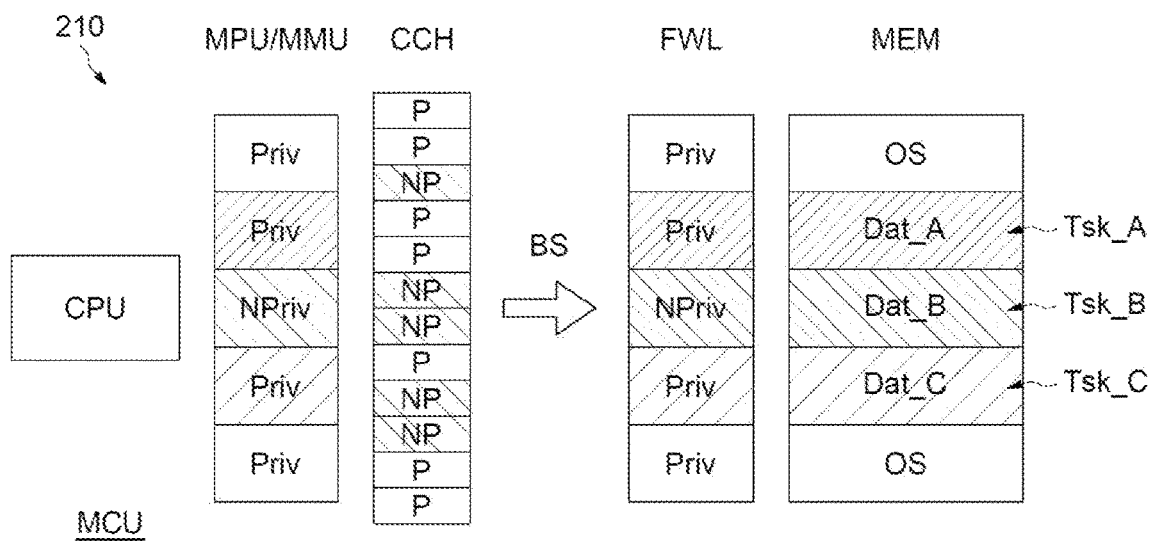
FIGS. 2A-3B represent states of access rights of a microcontroller according to embodiments.

FIG. 2A illustrates an example of a microcontroller MCU or of a microprocessor, produced in an integrated manner in an integrated circuit, in a given state 210 of its operation.

The microcontroller MCU includes a processing unit CPU, an access right management unit MPU/MMU, a cache memory CCH, as well as a memory MEM whose access from a bus BS is monitored and conditioned by a firewall mechanism FWL.

The processing unit CPU is configured to execute software tasks, for example, on the one hand, the execution of an operating system OS, and on the other hand, the execution of software applications Tsk_A, Tsk_B, Tsk_C which can by example be programs belonging to third parties providing services on the microcontroller MCU.

Figure 2B:
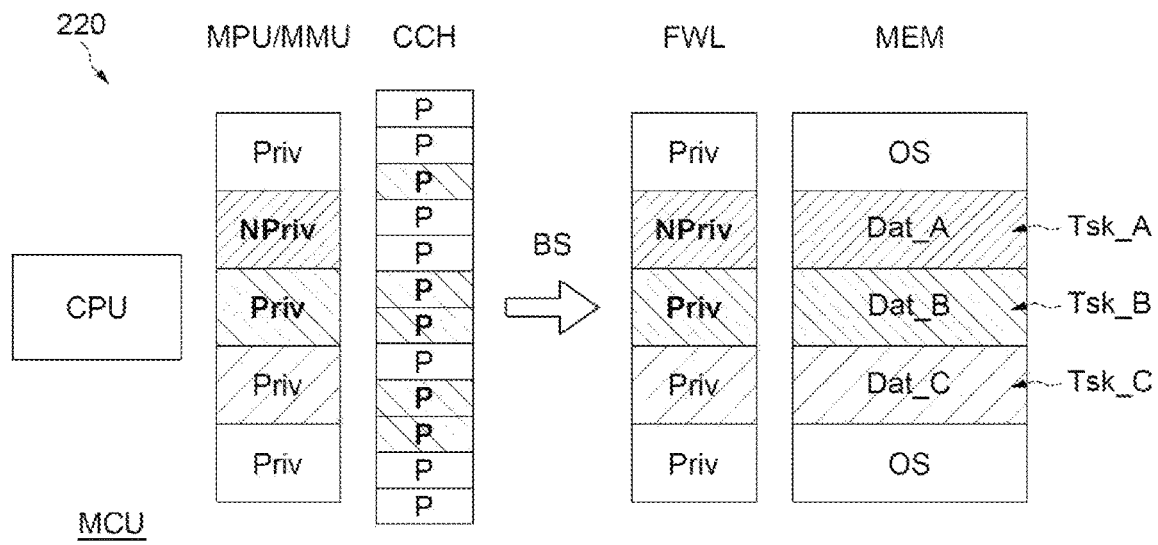
Figure 2C:
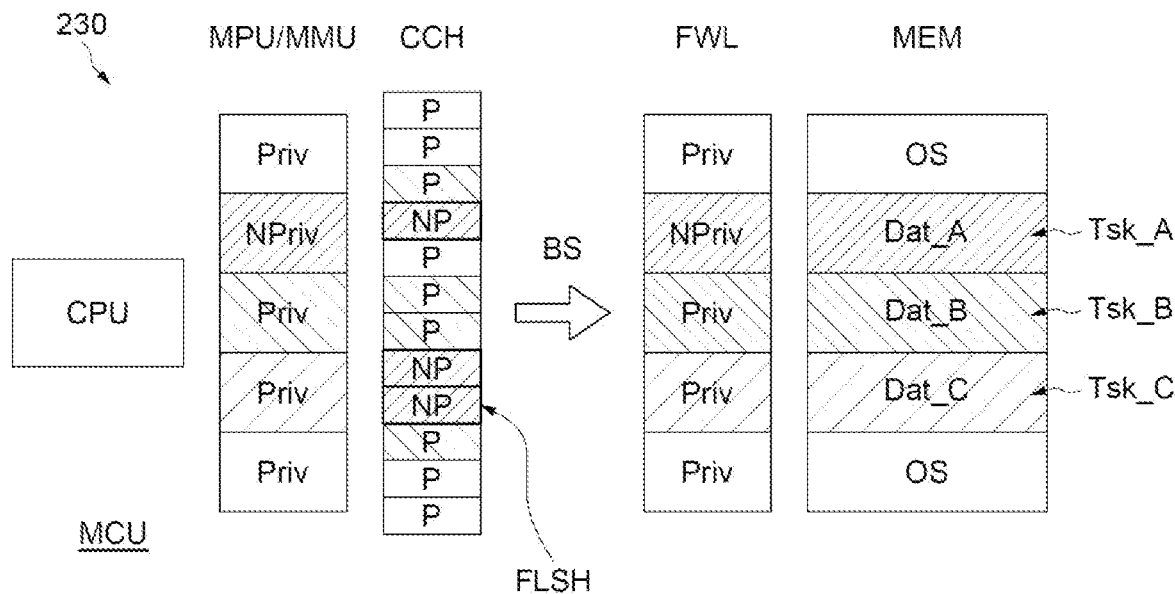
Figure 2D:
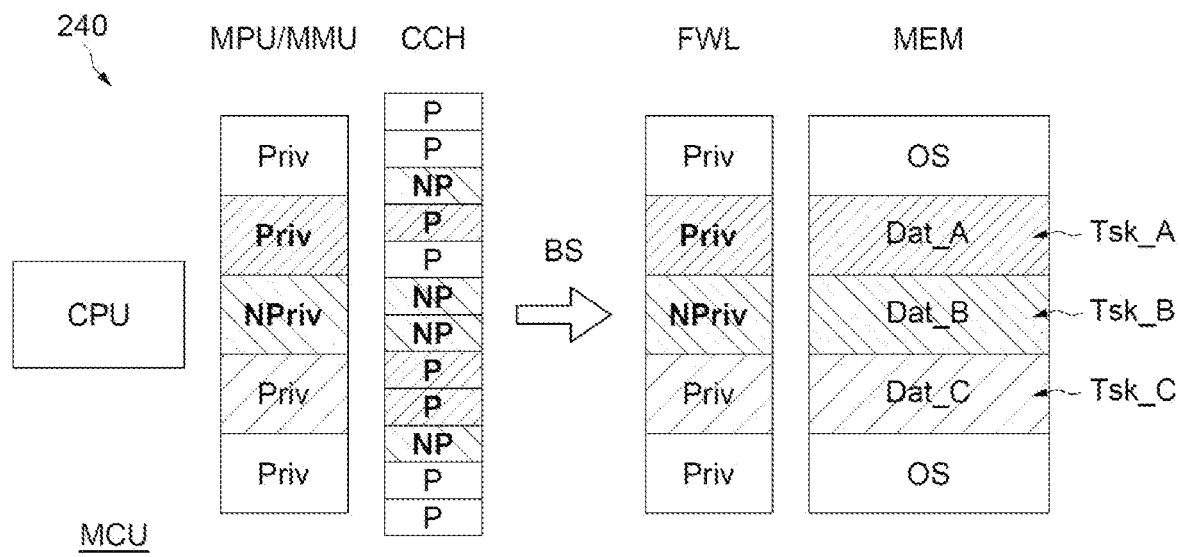
Figure 3A:
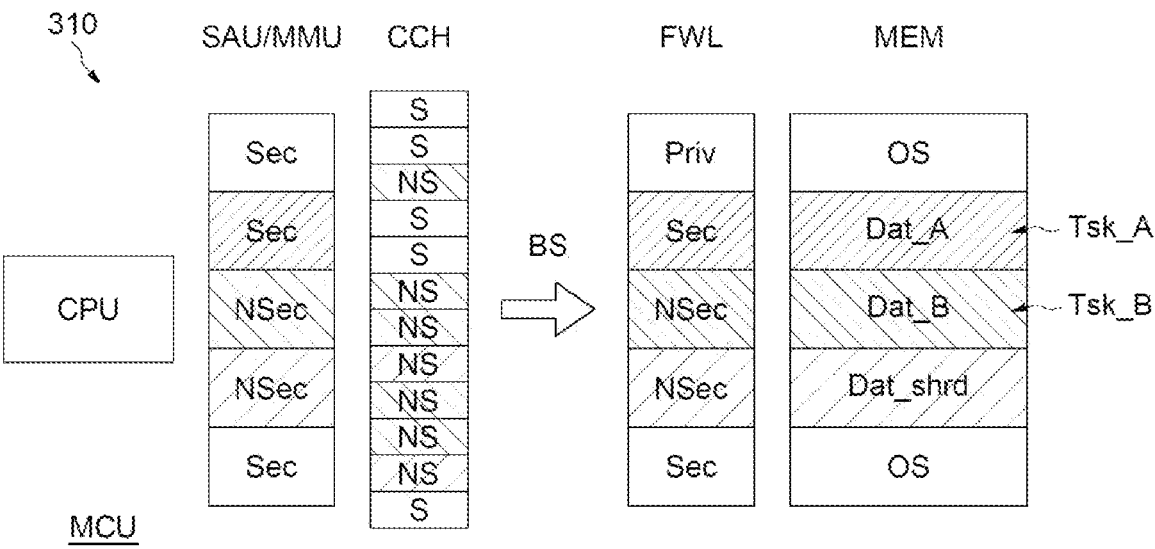
Figure 3B:
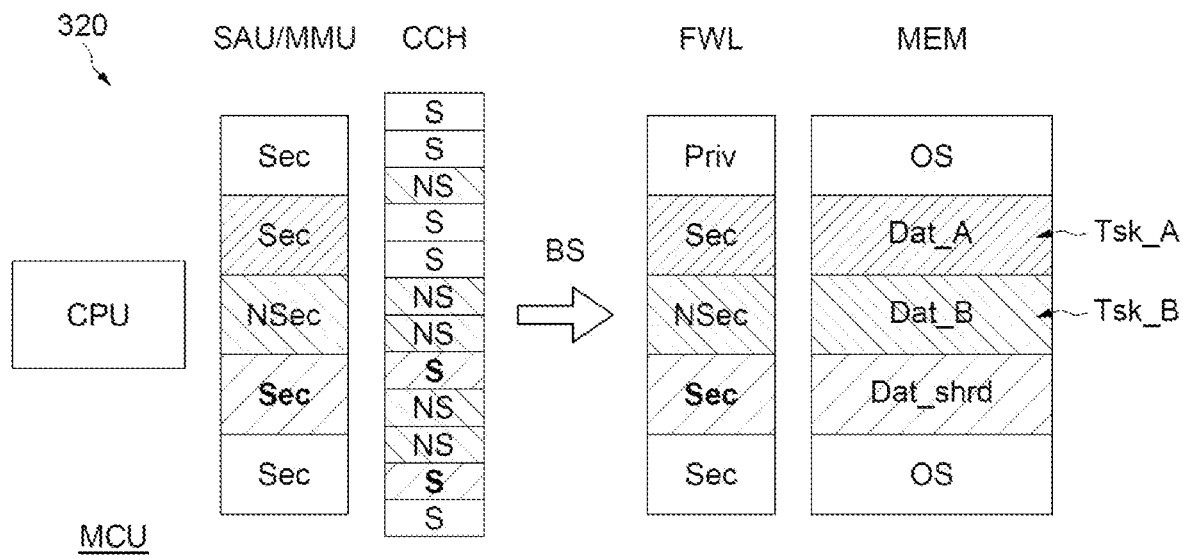

For reading FIGS. 2A, 2B, 2C and 2D, as well as FIGS. 3A and 3B, it will be noted that the elements relating to the same software task are hatched with the same hatching pattern in the different components of the microcontroller MCU. That is to say in details that the levels of access right of the access right management unit MPU/MMU, the attributes of the locations of the cache memory CCH, the monitoring conditions of the firewall FWL and the data Dat_A, Dat_B, Dat_C, OS of the memory MEM which relate to the same software task "Tsk_A", "Tsk_B", "Tsk_C", "OS" are hatched with the same hatching pattern, namely: narrow deviation rising oblique hatching for the task Tsk_A, average deviation downward oblique hatching for the task Tsk_B, large deviation rising oblique hatching for the task Tsk_C, and a void pattern for the task OS.

The processing unit CPU uses a cache memory CCH, which is a working memory used to store execution data of the tasks, such as intermediate data of calculations, of the internal variables, and also for example output data before transfer to a peripheral or to the memory MEM.

The cache memory CCH is materially close to the circuit of the processing unit CPU and is clocked by the processing unit CPU, providing optimum performance in this regard, but is usually limited in size.

The access right management unit MPU/MMU allows, at the request of the processing unit CPU, defining a level of access right Priv, NPriv, of the executed software tasks. The level of access right Priv, NPriv for each task is listed in the access right management unit MPU/MMU.

For example, the access right management unit MPU/MMU can be a memory protection unit "MPU", typically suitable for relatively simple microcontrollers MCU. Alternatively, as illustrated in the example of FIGS. 3A and 3B, the access right management unit MPU/MMU can be a memory management unit, typically suitable when the microcontroller is capable of managing virtual addresses, or even a security attribution unit in the context of the secure and non-secure level access rights (FIGS. 3A, 3B).

In this example, the access rights have a privileged level Priv or a non-privileged level NPriv, and allow in particular giving access or respectively preventing access to sensitive functions of the microcontroller MCU, for example functions of programming controls of the microcontroller, such as the configuration of the microcontroller at start-up (usually "boot") or the programming of the access right management unit MPU/MMU. Some hardware resources, such as stack registers, can be duplicated in privileged and non-privileged domains, respectively.

In the cache memory CCH, the execution data of the tasks is stored in memory locations, each memory location being represented by a rectangular line of the cache memory CCH. Each location of the cache memory is dedicated with an attribute P, NP representative of the level of access right of the software task whose execution data is stored in the respective memory location.

The attributes P, NP of the locations of the cache memory CCH can for example be coded on one bit. The attribute P corresponds to the privileged level Priv of the access rights, while the attribute NP corresponds to the non-privileged level NPriv of the access rights.

Furthermore, the access rights Priv, NPriv condition the access to the memory MEM, through the effect of the firewall mechanism FWL.

The memory MEM is intended to contain data Dat_A, Dat_B, Dat_C, OS relating to the software tasks Tsk_A, Tsk_B, Tsk_C, OS, for example the program codes of the software tasks, or the execution data of said tasks. The memory MEM can be a memory external or internal to the integrated circuit of the microcontroller MCU, of the random access memory type "RAM" or of the non-volatile type, such as a "Flash" memory.

The firewall mechanism FWL is configured to monitor the access to the data Dat_A, Dat_B, Dat_C relating to the software tasks of the memory MEM, in a manner conditioned by the access rights of the tasks Tsk_A, Tsk_B, Tsk_C corresponding to said data. The access rights Priv, NPriv to the data of the memory MEM are the same as the access rights defined in the access right management unit MPU/MMU for corresponding tasks Tsk_A, Tsk_B, Tsk_C. The conditions of access in the memory are in particular provided such that a non-privileged level task NPriv cannot access privileged level data Priv.

In this regard, in the case of change in the access rights Priv, NPriv of at least one task, the firewall mechanism FWL is advantageously capable of changing the protection of access to the memory MEM in accordance with said change.

The management of the access rights is in particular provided such that a task of non-privileged level NPriv cannot access privileged level data or functions Priv.

In practice, the active task, that is to say the task Tsk_B in the state 210, is placed at the hierarchically lower access right level, that is to say the non-privileged level NPriv, while the non-active tasks, in the state 210 the tasks Tsk_A, Tsk_C, are placed at the hierarchically higher level, that is to say the privileged level. Thus, during its execution, the active task Tsk_B cannot access data Dat_A, Dat_C, OS of the memory MEM relating to another task Tsk_A, Tsk_C, OS.

Reference is now made to FIG. 2B.

FIG. 2B illustrates a state 220 of the microcontroller MCU resulting from an example of change in the access rights of the state 210 of FIG. 2A. The elements changed in the state 220 are represented in bold, relative to the state 210.

In this example, the task Tsk_A has moved from the privileged level Priv to the non-privileged level NPriv, while the task Tsk_B has moved from the non-privileged level NPriv to the privileged level Priv. This may for example correspond to the case where the task Tsk_A has become active, for example following an interrupt received and processed by the processing unit CPU, or else due to execution priorities such as when the task Tsk_A requires a processing in real time.

Thus, the levels of access rights of the tasks have been changed in the Access right management unit MPU/MMU as well as the conditions of access to the memory which are monitored by the firewall FWL.

Furthermore, in the case of change in the access rights of the tasks Tsk_A, Tsk_B, the processing unit CPU is configured to change the attributes P, NP of the locations of the cache memory CCH containing the execution data relating to said changed tasks.

Only the attributes P, NP of the locations CCH of the cache memory are changed, the execution data contained in these memory locations is retained.

Thus, in the state 220, the attributes of the memory locations relating to the task Tsk_B correspond to the privileged level P, and could possibly be transferred to the memory MEM without being blocked by the firewall mechanism FW1 having the privileged condition Priv for the region Dat_B reserved for the task Tsk_B.

Reference is made in this regard to FIG. 2C.

FIG. 2C illustrates a state 230 of the microcontroller MCU resulting from its operation from the state 220.

The execution of the task Tsk_A generated execution data in locations of the cache memory CCH, represented by a thick line frame, with the attribute NP corresponding to the non-privileged level NPriv of the active task Tsk_A.

The use of the cache memory CCH can be done naturally and provide for an eviction FLSH (usually "flush") of a memory location previously used by the previous task Tsk_B. Since the attribute of the memory location of the eviction FLSH has been made consistent with the firewall conditions FWL, the execution data contained in this memory location can be saved in the corresponding region Dat_B of the memory MEM.

Reference is now made to FIG. 2D.

FIG. 2D illustrates a state 240 of the microcontroller MCU resulting from an example of changing the access rights of the state 230 of FIG. 2C. The elements changed in the state 240 are represented in bold, relative to the state 230.

In this example the task Tsk_B has returned to the non-privileged level NPriv, while the task Tsk_A has returned to the privileged level Priv. This may for example correspond to the case where the task Tsk_B has become active again, for example following the end of the processing of the task Tsk_A.

Thus, the levels of access rights Priv, NPriv of the changed tasks Tsk_A, Tsk_B have been changed in the access right management unit MPU/MMU as well as the conditions of access to the memory which are monitored by the firewall FWL, and as well as the attributes P, NP of the locations of the cache memory CCH containing execution data relating to said changed tasks Tsk_A, Tsk_B.

And advantageously, the execution data contained in the memory locations relating to the task Tsk_B which has been retained do not need to be reloaded from the memory MEM. A single memory location has been displaced to the memory MEM by cache line eviction FLSH (FIG. 2C), and only execution data contained in this memory location needs to be reloaded. The performance of the microcontroller MCU is consequently improved.

During changes in the level of access rights to the states 220, 240 (FIGS. 2B, 2D), the locations of the cache memory CCH for which the attributes P, NP are modified, can for example be selected by their address and their size, or advantageously by means of an identifier relating to each task Tsk_A, Tsk_B, Tsk_C. Such an identifier may for example be the "ASID" (for "Address Space Identifier") conventionally used for conventional cache memory management operations, such as the memory location evictions or the data invalidations, to distinguish between memory locations having the same virtual address.

In other words, it is advantageously proposed to identify the locations of the cache memory CCH containing execution data relating to the tasks Tsk_A, Tsk_B whose access rights are changed, by using the identifier "ASID" relating to each of said tasks Tsk_A, Tsk_B. This identification thus effectively allow changing the attributes P, NP of said locations of the cache memory CCH and retaining the execution data contained in said locations of the cache memory CCH.

Moreover, only a task of the hierarchically higher access right level, in this example the privileged level Priv, can control a change in the access rights of the microcontroller MCU (or microprocessor), and in particular the change or the update of the attributes of the locations of the cache memory CCH.

FIGS. 3A and 3B illustrate another example of a microcontroller MCU, in particular an application of the access right management, which is previously described in relation to FIGS. 2A to 2D, to another type of access rights Sec, NSec.

In this example, the access rights of the software tasks comprise a secure level Sec and a non-secure level NSec.

The secure Sec and non-secure NSec access rights correspond to a physical separation of the hardware elements of the microcontroller MCU of secure level and non-secure level. The secure level hardware elements are generally provided to implement critical security functions, such as encryptions and decryptions using secret keys.

A task of non-secure level NSec cannot access data or functions respectively contained or implemented by a secure level hardware element Sec.

In this example of a microcontroller MCU, the access right management unit SAU/MMU includes a security allocation unit "SAU" or, alternatively, a memory management unit "MMU".

In practice, the memory protection units "MPU" (FIGS. 2A-2D) and the security allocation units "SAU" are typically suitable for microcontroller integrated circuits; while the memory management units "MMU", capable of both ensuring the function of a memory protection unit "MPU" and the function of a security allocation unit "SAU", are typically adapted for integrated circuits of microprocessors.

FIG. 3A represents a state 310 of the operation of the microcontroller MCU, in which a task Tsk_A is of secure level Sec, while a task Tsk_B is of non-secure level NSec. Furthermore, a shared memory region Dat_shrd is assigned a non-secure level access right NSec. The shared memory region Dat_shrd is intended to contain data shared between the tasks Tsk_A and Tsk_B. possibly, the shared data can incorporate a code portion of a secure task, this code portion having non-secure level access rights.

The corresponding execution data is stored in locations of the cache memory CCH having the attributes S, NS corresponding to the access rights Sec, NSec of the respective tasks.

FIG. 3B represents a state 320 of the microcontroller MCU following a change in the access rights Sec, NSec of the software tasks. More particularly, the shared memory region Dat_shrd is moved to the secure level Sec.

Thus, the levels of access rights of the tasks and memory region Dat_shrd have been changed in the access right management unit SAU/MMU as well as the conditions of access to the memory monitored by the firewall FWL, and as well as the attributes S, NS of the locations of the cache memory CCH containing execution data relating to said modified memory region Dat_shrd.

Consequently, from the state 320, the data relating to the shared data Dat_shrd contained in the cache memory locations CCH is not lost, on the one hand. On the other hand, in the case of eviction of at least one of these memory locations, the data of the cache memory CCH can be recorded in the dedicated region Dat_shrd of the memory MEM without being blocked by the firewall FWL, given that their attributes S have been changed and are aligned with the change in the conditions of the firewall FWL.

The access right management allows switching from one mode to another (secure mode and non-secure mode) more quickly, with less loading and reloading of data from the cache memory to the memory MEM.

Moreover, it will be noted that the microcontroller MCU can provide both secure Sec and non-secure NSec level access rights, as well as, for each secure and non-secure level hardware domain, of privileged Priv and non-privileged NPriv level access rights.

Thus, the example of FIGS. 3A and 3B can be combined with the example of FIGS. 2A to 2D. From another point of view, the example of FIGS. 2A to 2D may correspond to an application of the management of the privileged Priv and non-privileged NPriv access rights in one or the other of the secure domain Sec or of the non-secure domain NSec of the example of FIGS. 3A and 3B.

Moreover, in the examples described above in relation to FIGS. 2A to 2D and 3A and 3B, the memory MEM can be a memory external or internal to the integrated circuit of a microcontroller MCU or of a microprocessor, of the random access memory type "RAM", or of the non-volatile type, such as a "Flash" memory.

And moreover, herein again, only a task of the hierarchically higher access right level, in this example the secure level Sec, can control a change in the access rights of the microcontroller MCU (or microprocessor), and in particular the change or the update of the attributes of the cache memory locations CCH.

On the other hand, it will be noted that the description given above in relation to FIGS. 2A-2D and 3A-3B corresponds to a use case of a "complete" microcontroller or microprocessor system in practice, hinged in relation to the advantageous ability of the cache memory CCH to be able to perform a change in at least one attribute P, NP, S, NS without changing the contents of the corresponding cache memory location.

Furthermore, there are external cache memory devices CCH, that is to say, not incorporated into the microcontroller or microprocessor integrated circuit.

Thus, the cache memory device CCH, which is intended to be controlled by a processing unit CPU, will also be considered in isolation, comprising memory locations configured to each have an attribute P, NP; S, NS representative of a level of access right Priv, NPriv; Sec, NSec of the contents of the respective memory location, the cache memory device CCH being capable, at the request of the processing unit CPU, of performing a change in at least one attribute P, NP; S, NS without changing the contents of the corresponding memory location.

The exemplary embodiments given above in relation to FIGS. 2A-2D and 3A-3B, in particular concerning the privileged/non-privileged and secure/non-secure access right levels, of course apply to the isolated device of cache memory CCH.

FIG. 4 illustrates an advantageous example of the implementation of the right updating process 400, in the case of change in the access rights Priv, NPriv; Sec, NSec of at least one task, in a microcontroller as previously described in relation to FIGS. 2A to 2D and 3A and 3B. Reference will be made to the elements which are previously described above in relation to FIGS. 2A to 3B.

The process 400 first comprises a step 402 of deactivating the interrupts of the processing unit CPU.

Thus, interrupts of the processing unit CPU which are received during the process 400, will not be processed as a priority. Consequently, the executions of the interrupts will not change the cache memory CCH, nor more particularly will not control evictions of the locations of the cache memory CCH during the process 400.

The process 400 further comprises a step 404 for locking the locations of the cache memory containing the execution data relating to the task(s) whose access rights are changed. The locking of the cache memory locations corresponds to a prohibition of changing these memory locations.

Then, the process 400 comprises a step 406 of changing the attributes P, NP; S, NS of the cache memory locations CCH, which contain execution data relating to said at least one task whose access rights are changed. The execution data contained in said cache memory locations is retained.

The firewall FWL and the access right management unit MPU/MMU are reprogrammed during a step 408.

The attributes of the cache memory locations CCH, the conditions of access to the memory MEM of the firewall FWL, and the access rights of the access right management unit MPU/MMU are then all aligned, that is to say, all consistent.

The cache memory locations CCH which are locked in step 404 can then be unlocked in step 410.

Locking 404 before changing 406 the attributes and unlocking 410 after changing the attributes allows guarding against possible evictions of cache memory locations CCH by the implementation of the process 400 itself.

Finally, the interrupts of the processing unit CPU are reactivated in a final step 412 of the process 400.

It is tolerable to deactivate the interrupts during the whole process 400, given the simplicity of implementation and therefore the speed of execution of said process 400.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for managing access rights of software tasks executed by a processing unit (CPU) using a cache memory containing execution data of the tasks in memory locations, each execution data having an attribute representative of a level of access right of a respective task, the method comprising:
    changing the attributes of the locations of the cache memory when the access right of at least one task changes;
    retaining the execution data contained in the locations of the cache memory;
    locking the locations of the cache memory containing the execution data before the change in the attributes; and
    unlocking after the change in the attributes.

2. The method according to claim 1, wherein the access rights of the software tasks are defined by an access right management unit.

3. The method according to claim 1, further comprising:
    monitoring, by a firewall mechanism, an access to a memory containing data related to the software tasks, wherein the access depends on the access rights of the software tasks; and
    changing conditions of the firewall mechanism for access to the data related to the at least one task following the change in the access rights.

4. The method according to claim 1, wherein the access rights of the software tasks comprise a privileged level and a non-privileged level such that a non-privileged level task cannot access data or functions of the privileged level.

5. The method according to claim 1, wherein the access rights of the software tasks comprise a secure level and a non-secure level such that a non-secure level task cannot access data or functions respectively contained or implemented by a secure level hardware element.

6. The method according to claim 1, further comprising:
    deactivating interrupts of the CPU throughout an updating process.

7. The method according to claim 6, wherein the updating process is only controllable by a task having a level of access right, which is hierarchically higher than or equal to the level of access right represented by the changed attribute.

8. The method according to claim 1, wherein the access rights comprise a privileged level and a non-privileged level, and wherein the attributes comprise a privileged attribute and a non-privileged attribute.

9. The method according to claim 1, wherein the access rights comprise a secure level and a non-secure level, and wherein the attributes comprise a secure attribute and a non-secure attribute.

10. An integrated circuit comprising:
    a processing unit (CPU) configured to execute software; and
    a cache memory configured to contain execution data of software tasks in memory locations, each execution data having an attribute representative of a level of an access right of a respective task,
    wherein the CPU is configured to:
        change the attributes of the locations of the cache memory containing the execution data when the access right of at least one task changes,
        retain the execution data contained in the locations of the cache memory,
        lock the locations of the cache memory containing the execution data relating to the at least one task before the change in the attributes, and
        unlock the locations after the change in the attributes.

11. The integrated circuit according to claim 10, further comprising an access right management unit configured to define the access rights of the software tasks.

12. The integrated circuit according to claim 10, further comprising:
    a firewall mechanism configured to monitor an access to a memory configured to contain data related to the software tasks, wherein the access depends on the access rights of the software tasks,
    wherein the CPU is configured to change conditions of the firewall mechanism for the access to the data related to the at least one task following a change of the attributes.

13. The integrated circuit according to claim 10, wherein the access rights of the software tasks comprise a privileged level and a non-privileged level, and wherein the CPU is configured such that a non-privileged level task cannot access data or functions of the privileged level.

14. The integrated circuit according to claim 10, further comprising secure level hardware elements and non-secure level hardware elements, wherein the access rights of the software tasks comprise a secure level and a non-secure level, and wherein the CPU is configured such that a non-secure level task cannot access data or functions which are respectively contained or implemented by a secure level hardware element.

15. The integrated circuit according to claim 10, wherein the CPU is further configured to deactivate interrupts of the CPU during the change of the attributes of the locations of the cache memory.

16. The integrated circuit according to claim 10, wherein the CPU is configured such that the change in the access right of at least one task is only controllable by a task, executed by the CPU, having a level of access right which is hierarchically higher than or equal to the level of access right represented by the changed attribute.

17. The integrated circuit according to claim 10, wherein the access rights comprise a privileged level and a non-privileged level, and wherein the attributes comprise a privileged attribute and a non-privileged attribute.

18. The integrated circuit according to claim 10, wherein the access rights comprise a secure level and a non-secure level, and wherein the attributes comprise a secure attribute and a non-secure attribute.

\* \* \* \* \*